United States Patent Office 3,327,696
Patented June 27, 1967

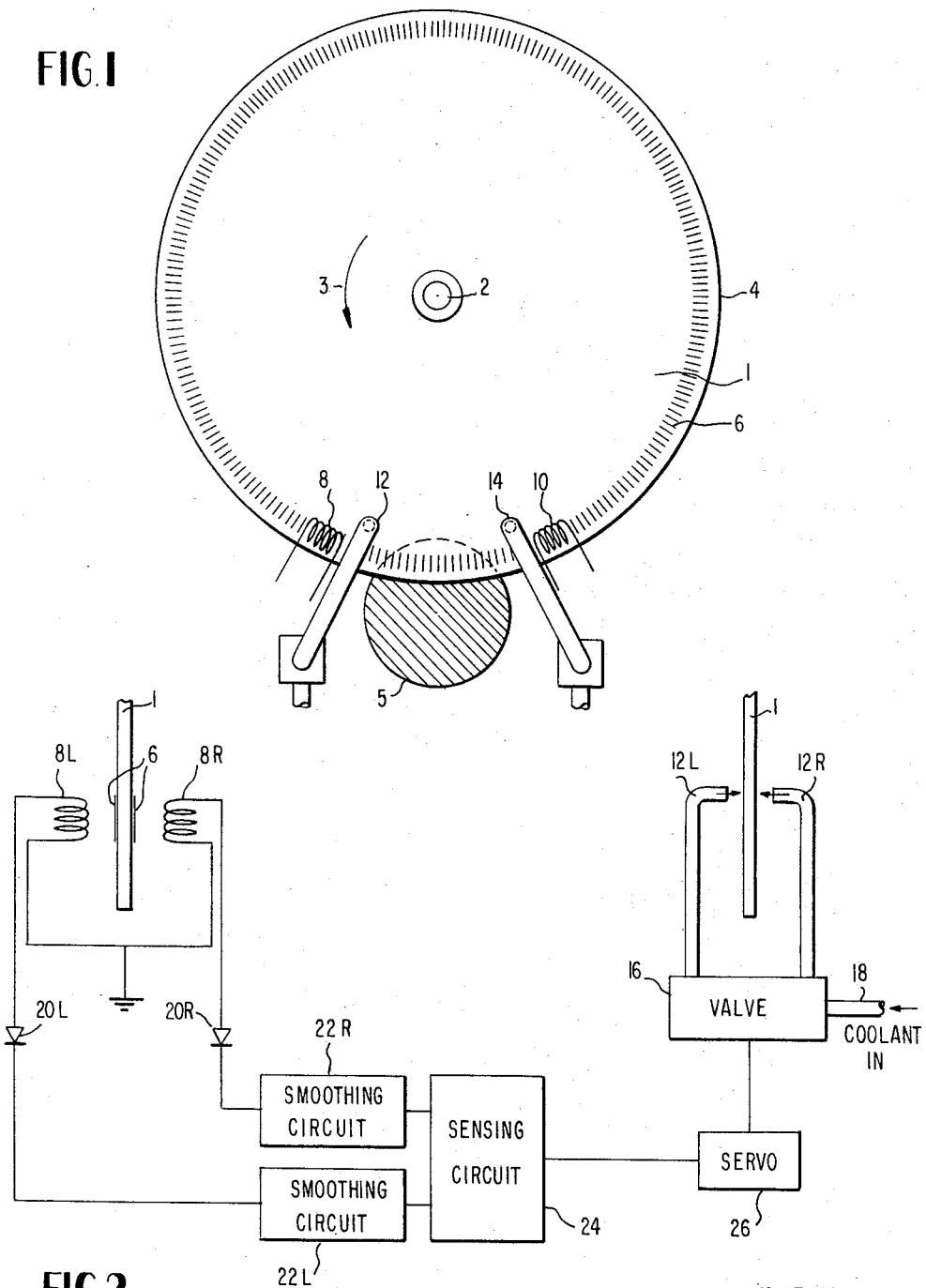

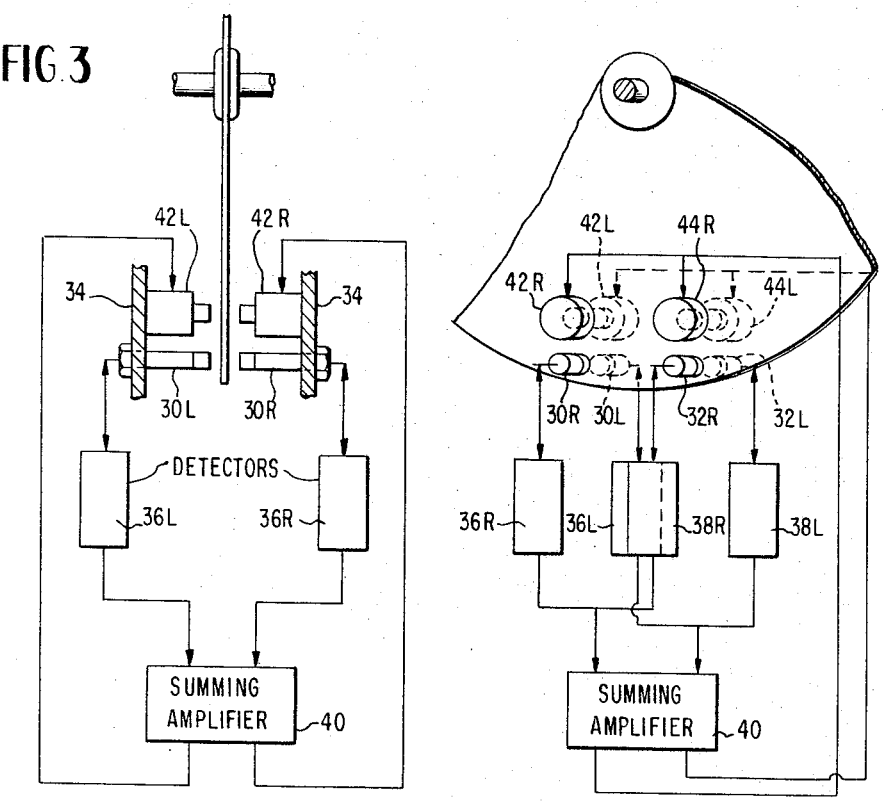
FIG.3
FIG.4
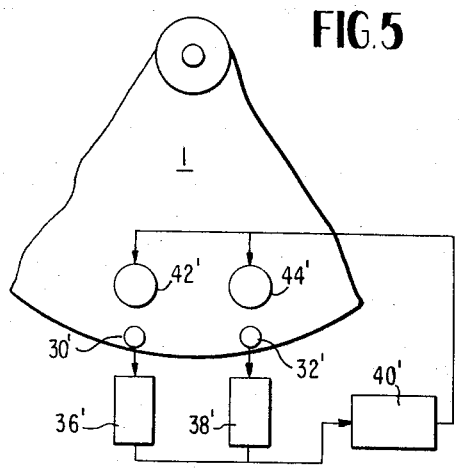
FIG.5
INVENTORS
HOWARD H. AIKEN
ROBERT W. BIRRELL
BY
Sughrue, Rothwell, Mion,
Zinn & Macpeak
ATTORNEYS

3,327,696
SAW STABILIZING MEANS AND METHOD
Howard H. Aiken and Robert W. Birrell, Carlisle, Pa., assignors to Howard Aiken Industries, Carlisle, Pa., a corporation of Delaware
Filed Oct. 9, 1964, Ser. No. 402,878
10 Claims. (Cl. 125—13)

This invention relates to the art of cutting thin slabs from a block of material and particularly to a method and means for cutting extremely thin parallel-sided slabs or wafers of expensive material with a minimum of waste.

In the cutting of relatively expensive material, such as quartz and silicon into thin slabs for oscillators, transistors, or integrated circuit slabs for example, it is important for the sides of each slab to be as nearly parallel as possible. It is also necessary, in the interest of economy, to reduce the kerf loss to a minimum.

An obvious expedient to reduce the proportion of sawdust per slab is to use a thin saw. However, a limitation arises in the fact that a thin saw is more flexible than a thick one and tends to wobble. The wobbling not only increases the width of the kerf but impairs the parallelism of the sides of the slabs. The sides should generally be parallel to within .0001 inch or less.

Also, uneven diamond wear on the periphery of a saw blade causes the blade to lead off, that is, the saw does not cut on a straight line. Another factor causing lead off is uneven coolant flow to opposite faces of the saw.

It is an object of this invention to provide a saw stabilized means and method for producing thin slabs of relatively expensive material having parallel sides, within low tolerances, with a minimum of waste in kerf loss while utilizing straight cuts by eliminating blade lead off.

In accordance with the invention this objent is achieved by cutting the material with a very thin rotary saw blade, sensing any deviation of the blade from a true path at the cutting zone, and, in response to such deviation, applying an adjusting force to the blade near its periphery to bring it back into the true path. In a preferred form of the invention the sensing of the blade position is accomplished by a non-contacting sensing means for sensing error or rate of error ad capable of responding to minute variations (whether due to a lead off bend or due to blade wobble) in axial position or a peripheral portion of the blade at the cutting zone. The adjusting force, in this preferred form of the invention, may be applied, for example, by controlling jets of coolant directed toward the sides of the blade, or, by electromagnetic means placed in proximity to the cutting zone of the saw blade, so that its flux passes through the saw blade.

Other objects of the invention will be pointed out in the following description and claims and illustrated in the accompanying drawings, which disclose, by way of example, the principle of the invention and the best mode which has been contemplated of applying that principle.

In the drawings:

FIGURE 1 is a vertical section of one form of cutting mechanism embodying the invention, taken transversely to the saw axis, FIGURE 2 is a block diagram of a control system utilizing the stabilizing means shown in FIGURE 1, and FIGURES 3 and 4 are two diagrammatic views, respectively parallel to, and transverse to, the saw axis, of another embodiment of the invention.

FIGURE 5 is a diagrammatic view similar to FIGURE 4 of a further embodiment of the invention.

A preferred embodiment of the invention shown in FIGURES 1 and 2 of the drawings comprises a circular saw blade 1 mounted on a shaft 2 for rotation in the direction of the arrow 3. The blade may be of sheet steel, for example, having its periphery 4 impregnated with a hard cutting powder, such as diamond powder, in the usual manner. The workpiece to be cut is shown as a cylindrical block 5 of material, such as quartz, silicon or the like; it is mounted on a support (not shown). The mounting of the saw blade and workpiece are such that they may be fed radially relative to each other by known means.

In order to reduce the width of the kerf to a minimum, the saw may have a thickness of .007 inch, for example. A saw of this degree of thinness is flexible and has a tendency to wobble as it rotates, and its inherent resistance to lead off is quite small. In accordance with the invention these wobbling and lead off tendencies are controlled in one preferred embodiment, by the means now to be described.

A ring-shaped band of magnetic spots 6 is established on both sides of the saw blade near its periphery. The spots are equidistantly spaced at, for example, .001 inch. In the case of a steel saw blade they may be recorded directly on the steel of the blade by any of the well known methods of recording on magnetic drums and disks used in data processing machines. While this could be done by forming physical teeth around the ring and magnetizing them, due to the thinness of the blade it is preferable to apply an alternating magnetic field to the disk as it revolves, by means of recording heads, through the coils of which alternating current is passed, of a frequency so related to the speed of revolution of the disk as to produce an undulating magnetic record, the peaks of which are equidistant and divide evenly into the circumference of the circular band. Thereby a recording is made in which the peaks or spots are uniformly spaced at a suitable distance, such as .0001 inch. Techniques for accomplishing such a recording are known in the data processing art. In the case of a copper saw the surface can be nickel-plated or coated with an oxide powder before recording.

Mounted in stationary positions in a cutting zone before and behind where the saw blade 1 cuts through the block 5, are two pairs of magnetic read heads 8 and 10 of the type used in magnetic data processing, each pair comprising two read heads on opposite sides of the blade. The two read heads of one pair are shown at 8R and 8L in FIGURE 2. The read heads of the pair 10 are identical. Each pair of read heads is mounted in a stationary position with the cores of the read heads (not shown) mounted exactly the same distance from the respective sides of the saw when it is located in its true path. The operation of the read heads will be further described presently in relation to FIGURE 2.

Also mounted in stationary position ahead of and behind the cutting segment of the saw, near its periphery, are two pairs of coolant pipes 12 and 14, each pair comprising a pipe on each side of the saw. The lefthand pair in FIGURE 1, as shown in FIGURE 2, comprises pipes 12R and 12L. The other pair of pipes 14 is identical. Each pair of pipes is rigidly mounted on a valve block 16 through which coolant received into the valve through an inlet 18 is supplied to the pipes normally at an equal rate. Thereby, in the normal condition the forces of the jets from the coolant pipes are equal and their resultant force on the saw blade is zero. The coolant may be any suitable fluid; it may be air, or a liquid, such as oil or an aqueous lubricant, for example.

Turning now to FIGURE 2, there is shown a block diagram of the system comprising the pair of read heads 8R, 8L and the pair of coolant pipes 12R, 12L. An identical system is provided for the read heads 10 and coolant pipes 14, so a description of one of the systems will suffice for both. When the saw is running at normal speed in its true path equal alternating voltages are induced across the coils of the two read heads 8L and 8R, which cause pulsating D.C. currents to flow through rectifiers 20R and 20L and respective smoothing circuits 22R and 22L, to opposite terminals of a sensing circuit 24, which may be a differential amplifier, for example. The sensing circuit 24 could incorporate known means to sense the rate of error. In the normal condition, when the saw blade is centered between the read heads, these currents will be exactly balanced and there will be no output from the sensing circuit. If the saw blade wobbles slightly toward the right-hand read head 8R the current induced in the coil of that read head will be greater than normal, while that induced in the read head 8L will be less than normal, since the currents induced in the read heads are inversely proportional to the width of the air gaps between the read heads and the magnetic records on the saw blade. Thus an imbalance occurs in the sensing circuit and an output voltage is delivered to a servo mechanism 26 which controls the valve in the block 16, to change the proportion of flow of coolant from the pipes 12R and 12L. The polarity of the voltage from the sensing circuit is such as to cause the servo to move the valve in block 16 in the direction to cause a greater flow of coolant in the right-hand pipe 12R and a smaller flow in the left-hand pipe 12L. The resultant force of the jets from pipes 12R and 12L has a direction and magnitude such as to restore the blade to its true path. Since the arrangement is symmetrical the same result will occur in the reverse direction when the saw wobbles towards the left.

The same action just described as occurring ahead of the cutting segment takes place behind the cutting segment, through the action of the read head pair 10 and coolant pipes 14. The short segment of the saw blade between the two pairs of read heads and coolant pipes is therefore maintained close to the true position.

Other means may be used both for the sensing of the axial position of the cutting sector of the saw and for the application of forces to stabilize the position of the saw. FIGURES 3 and 4 show another example of suitable means for these functions. Once again, the system is shown in a push-pull arrangement, with duplicate sensing and forcing means on opposite sides of the saw. The sensing and detecting means diagrammatically represented in these two figures is a non-contacting micrometer, which may be of the type manufactured by Bentley Nevada Corporation, of Minden, Nevada. Four sensing heads 30R, 30L and 32R, 32L, which may be Bentley Navada Corporation Model H1, for example, are mounted on a stationary support 34 on opposite sides of the saw and before and behind the cutting sector of the saw, the ends of the heads being closely adjacent to the surfaces of the saw. The heads receive electric power from, and transmit signals back to, detectors 36R, 36L and 38R, 38L, respectively. These detectors may be Bentley Nevada Corporation Model D-152 on the right side of the saw blade and D-152R on the left side, the difference between the two being only that their output signals are of reverse polarity.

The output signals on each side of the saw are fed to two input terminals of a summing amplifier 40, those on the right side being combined in a pair, as shown in FIGURE 4, and those on the left side being similarly paired, to average the signals from the sensing heads before and behind the cutting sector of the saw for each side.

An output from one output terminal of the summing amplifier 40 goes in parallel to two electromagnets 42R and 44R as a pair, and an output from another terminal of the summing amplifier goes to a similar pair of electromagnets 42L and 44L on the left side of the saw.

The electromagnetic forcing means of the embodiment shown in FIGURES 3 and 4 requires the use of a saw blade which is composed of, or covered with a paramagnetic material, such as steel.

The second embodiment operates in a manner generally similar to the first. The proximity senser heads 30R, 30L and 32R, 32L are wound with pancake coils which receive current from their respective detectors 36R, 36L and 38R, 38L. The coils are selectively loaded by the saw blade, in dependence upon its proximity to each sensing head, thus the signal currents flowing in the individual sensing heads and respective detectors reflect the proximity of the saw to each head. The outputs from the detectors on the right side of the saw are merged and supplied to one terminal of the summing amplifier 40; those on the left side are similarly merged and transmitted to another terminal of the summing amplifier. The summing amplifier delivers from its two output terminals signals representative of the difference between the two input signals to the summing amplifier and of such relative values as to establish unbalanced electromagnetic forces at the right and left side force generators 42R, 44R and 42L, 44L, to oppose the deviation of the cutting sector of the saw.

That is to say, the output signal from the right side terminal of the summing amplifier is reduced when the input signal to the right side of the summing amplifier increases; while on the left side the situation is reversed, the signals on the two sides being inversely proportional to each other.

Instead of pairing the signals from the senser heads on the right side and those on the left side of the saw, and similarly, feeding the right side force generators in parallel and the left side force generators in parallel, the sensing heads and force generators on each side can be treated individually, those at the front of the cutting sector operating as one group and those at the rear of the cutting sector operating as one group.

Instead of having a pair of sensing means on opposite sides of the blade 1, the sensing means could be on only one side of the blade as shown in FIGURE 5. In this embodiment, movement of the face of the blade toward and away from sensors 30' and 32' due to wobble or lead off causes these sensors to provide varying signals to their respective detectors 36' and 38'. These detectors 36' and 38' feed a control means such as amplifier 40' which in turn controls the application of force to the saw forcing means, electromagnets 42' and 44'. The electromagnets 42' and 44' can attract or repel the blade 1 according to the sensed deviation or rate of deviation from a true saw blade position.

While various embodiments of the invention have been described by way of example, which utilize particular forms of wobble sensing and force generating devices to maintain a stable position of the cutting portion of the saw, it is evident that various other forms of mechanisms having these functions can be utilized without departing from the principle of the invention, as defined in the following claims.

What is claimed is:

1. In the art of cutting thin slabs from a block of material while maintaining parallelism of the sides of the slab by utilizing sensing means and force applying means to prevent saw blade lead off and to reduce waste, the method which comphises; cutting the material with a thin rotary saw blade, sensing the axial position of the saw blade relative to a desired, and true path without physically contacting said blade while the blade is rotating, generating an error signal when said axial position deviates from the true path, and applying a force to said blade adjacent said material without solid physical contact between said force applying means and said blade in a direction opposite to the deviation in response to the error signal to return the blade to the true path.

2. In the art of cutting thin slabs from a block of material to maintain parallelism of the sides of the slabs to prevent saw blade lead off and to reduce waste, the method which comprises; cutting the material with a thin rotary saw blade, sensing the axial position of the saw blade immediately adjacent a zone where the saw cuts the material, generating an error signal when said position deviates from a true path, directing jets of fluid at opposite sides of the saw blade to produce a resultant force of said jets upon the saw blade, and inversely varying the forces of said jets in response to said error signal to diminish said deviation.

3. In the art of cutting thin slabs from a block of material to maintain parallelism of the sides of the slabs to prevent saw blade lead off and to reduce waste, the method which comprises; cutting the material with a thin rotary saw blade, sensing the axial position of the saw blade adjacent a zone of cutting and while the blade is rotating, generating an error signal when said position deviates from a true path, and applying to the portion of the saw blade adjacent the material being cut an electromagnetic force proportional to the error signal and tending to move said portion of the saw blade in a direction opposite to its deviation.

4. In a machine for cutting thin slabs from a block of material, a thin rotary saw blade mounted for rotation in a true path, but subject to wobbling and lead off deviations from said true path; means adjacent to and spaced from the face of the blade for sensing said deviations; and means responsive to said sensing means for applying correcting forces to said saw blade to diminish said deviations without solid physical contact between the force applying means and said blade.

5. In a machine for cutting thin slabs from a block of material, saw blade stabilizing means comprising; a thin rotary saw blade having a circular magnetic band near its periphery for establishing on at least one side of the saw blade an undulating magnetic field, means for sensing said magnetic field including sationary sensing means on at least one side of the saw blade and spaced a predetermined distance from the side of the saw blade when the latter is in a true position, means responsive to said sensing means for generating an error signal corresponding in direction and magnitude to any deviation of the saw blade from said true position, means for directing fluid jets at opposite sides of said saw blade, and means responsive to said error signal for controlling the relative force of said jets to diminish said deviation.

6. A saw stablizing means as defined in claim 5 wherein there are magnetic bands on both sides of the blade and sensing means on both sides of the blade.

7. A saw stablizing means as defined in claim 6 wherein the means responsive to the error signal for controlling the relative force of the jets is a servo controlled valve, and wherein the fluid of the jets is a coolant.

8. In a machine for cutting thin slabs from a block of material, saw blade stabilizing means comprising; a thin rotary saw subject to deviation from a true position, stationary sensing means mounted in lateral proximity to a cutting segment of said saw, said sensing means including means for generating an error signal proportionally representative of any deviation of the cutting segment of said saw from the true position, and transducer means responsive to said error signal for applying to the cutting segment of said saw an electromagnetic force tending to move the cutting segment in a direction to reduce said deviation.

9. In a machine as defined in claim 8 wherein the sensing means includes electromagnet sensors positioned on one side of the blade in a cutting zone on each side of where the blade would enter and leave the material being cut.

10. In a machine as defined in claim 8 wherein the sensing means includes two pairs of electromagnet sensors, one of each pair being on each side of the blade and each pair being on each side of where the blade would enter and leave the material being cut.

References Cited
UNITED STATES PATENTS

| | | | |
|---|---|---|---|
| 195,626 | 9/1877 | McDonough | 143—157 X |
| 2,544,156 | 3/1951 | Hathaway | 51—165 X |
| 2,743,717 | 5/1956 | Wilkin | 125—13 |
| 2,914,100 | 11/1959 | Lindholm | 143—160 |

LESTER M. SWINGLE, *Primary Examiner.*